(12) United States Patent
Lin (10) Patent No.: US 7,659,496 B2
(45) Date of Patent: Feb. 9, 2010

(54) LIGHT EMITTING DEVICE AND CONTROL METHOD THEREOF

(75) Inventor: Chung-Jyh Lin, Tainan County (TW)

(73) Assignee: Aussmak Optoelectronic Corp., YongKang, Tainan County (TW)

( * ) Notice: Subject to any disclaimer, the term of this patent is extended or adjusted under 35 U.S.C. 154(b) by 0 days.

(21) Appl. No.: 12/212,492

(22) Filed: Sep. 17, 2008

(65) Prior Publication Data
US 2009/0078853 A1    Mar. 26, 2009

(30) Foreign Application Priority Data
Sep. 21, 2007    (TW) ............................... 96135433 A (51) Int. Cl.
*G01J 1/32* (2006.01)
(52) U.S. Cl. ..................... 250/205; 347/236
(58) Field of Classification Search ................ 250/205, 250/235, 201.1, 204, 206; 347/236–238; 358/506, 509, 475
See application file for complete search history.

(56) References Cited
U.S. PATENT DOCUMENTS

| 5,710,589 A * | 1/1998 | Genovese | 250/205 |
| 6,350,978 B1 * | 2/2002 | Kasai | 250/205 |
| 6,560,256 B1 * | 5/2003 | Seki et al. | 250/205 |
| 7,190,454 B2 * | 3/2007 | Hsu et al. | 356/394 |
| 2007/0159422 A1 * | 7/2007 | Blandino et al. | 345/82 |

* cited by examiner

*Primary Examiner*—Seung C Sohn
(74) *Attorney, Agent, or Firm*—Birch, Stewart, Kolasch & Birch, LLP (57) ABSTRACT

A light emitting device includes at least one light emitting unit, a switching unit, a comparator unit, a charge storage unit and a sensing unit. The switching unit is electrically connected to the light emitting unit. The comparator unit is electrically connected to the switching unit. The charge storage unit is electrically connected to the comparator unit and stores an amount of electric charges. The sensing unit has a light sensing circuit and is electrically connected to the charge storage unit. The light sensing circuit senses a light intensity of the light emitting unit. The sensing unit adjusts the amount of the electric charges and a voltage corresponding to the amount of the electric charges according to the light intensity. The comparator unit compares the voltage with a threshold voltage. The switching unit controls the light emitting unit in accordance with the result of the comparison.

22 Claims, 10 Drawing Sheets

LIGHT EMITTING DEVICE AND CONTROL METHOD THEREOF

CROSS REFERENCE TO RELATED APPLICATIONS

This Non-provisional application claims priority under 35 U.S.C. §119(a) on Patent Application No(s). 096135433 filed in Taiwan, Republic of China on Sep. 21, 2007, the entire contents of which are hereby incorporated by reference.

BACKGROUND OF THE INVENTION

1. Field of Invention

The invention relates to a light emitting device and a control method thereof.

2. Related Art

If the liquid crystal display (LCD) device such as a LCD TV or a computer screen uses the light emitting diodes (LED) as the light source of the backlight module, tens to hundreds of LEDs are usually needed. For a better display image with true color, it is important to control the average brightness of the LEDs. Normally, the LCD device includes a LCD panel and a backlight module.

Figure 1:
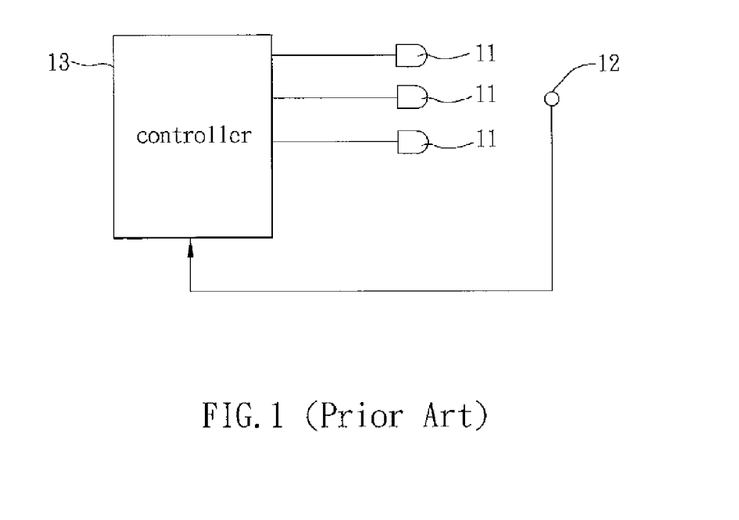
FIG. 1 is a structural schematic view of a conventional light intensity adjustment of a LED.

Referring to FIG. 1, the conventional backlight module has a plurality of LEDs 11, a light detector 12, and a controller 13. The light detector 12 detects the brightness generated from each LED 11 and then produces a feedback signal, which is sent to the controller 13, according to the brightness. The controller 13 adjusts the brightness of the corresponding LEDs 11 according to the feedback signal.

However, conventionally the light detector 12 detects the light intensity of the LEDs 11 and produces the feedback signal, and the brightness of the LEDs 11 is then adjusted by the controller 13 according to the feedback signal. As the number of the LEDs 11 increases, the number of the controllers 13 must increase as well hence the cost rises.

Therefore, it is an important subject of the invention to properly control the brightness of the light emitting unit and lower the manufacture cost.

SUMMARY OF THE INVENTION

In view of the foregoing, the invention is to provide a light emitting device and a control method thereof for properly controlling the light intensity of a light emitting unit and reducing the manufacture cost.

To achieve the above, a light emitting device of the invention includes at least one light emitting unit, a switching unit, a comparator unit, a charge storage unit, and a sensing unit. The switching unit is electrically connected to the light emitting unit. The comparator unit is electrically connected to the switching unit. The charge storage unit is electrically connected to the comparator unit and stores an amount of electric charges. The sensing unit is electrically connected to the charge storage unit and has a light sensing circuit. The light sensing circuit is used to sense the light intensity of the light emitting unit. The sensing unit adjusts the amount of the electric charges and a voltage corresponding to the amount of the electric charges according to the light intensity. The comparator unit compares the voltage with a threshold voltage. The switching unit controls the light emitting unit in accordance with the result of the comparison.

In addition, to achieve the above, the invention discloses a control method of a light emitting device, which includes at least a light emitting unit, a switching unit, a comparator unit, a charge storage unit, and a sensing unit. The switching unit is electrically connected to the light emitting unit. The comparator unit is electrically connected to the switching unit. The charge storage unit is electrically connected to the comparator unit. The sensing unit is electrically connected to the charge storage unit and has a light sensing circuit. The control method includes the steps as follow: storing an amount of electric charges in the charge storage unit; sensing a light intensity of the light emitting unit by the light sensing circuit; adjusting the amount of the electric charges and a voltage corresponding to the amount of the electric charges by the sensing unit; comparing the voltage with a threshold voltage by the comparator unit; and controlling the light emitting unit by the switching unit in accordance with the comparison result.

As mentioned above, the light emitting device and the control method thereof of the invention utilizes the characteristics of the light sensing element of the sensing unit that can generate the photocurrent after receiving a light from the light emitting unit to adjust the amount of the electric charges in the charge storage unit. Moreover, a background reference value element that does not receive the light is used to generate a background dark current reference value. The amount of the electric charges in the charge storage unit is adjusted in accordance with the difference between the photocurrent value and the background dark current reference value so as to compensate the effects caused by a background dark current. Another way to compensating is that in a threshold voltage generating circuit, the threshold voltage is adjusted in accordance with a background reference value element. Thus, when the comparator unit compares, the effects caused by the background dark current are offset. Thereby the comparator unit determines the time range of the light emission so as to control the accumulating light energy. Namely, when the accumulating light energy reaches a preset value, the switching unit controls the light emitting unit to end the light emission. What is worth to be mentioned is that the light emitting device and its control method do not have a feedback control on the light intensity as the light emitting unit is emitting but control only the accumulating light energy so as to reduce the cost of the circuit structure. Furthermore, with the modulization of the integrated circuit, the number of the elements can be effectively reduced hence lower the cost.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

First Embodiment

Figure 2:
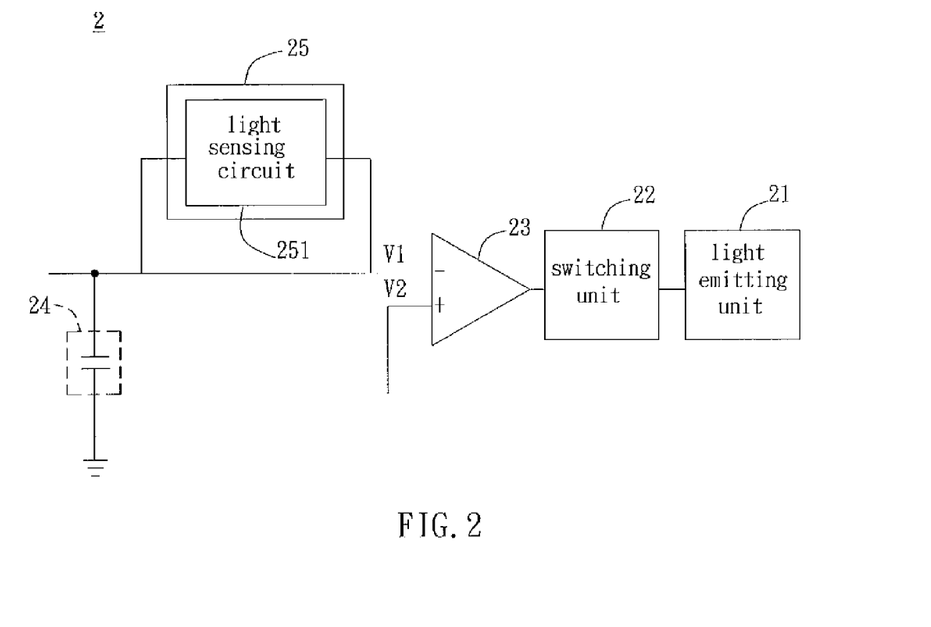
FIG. 2 is a block diagram of a light emitting device according to a first embodiment of the invention.

With reference to FIG. 2, a light emitting device 2 according to a first embodiment of the invention includes at least one light emitting unit 21, a switching unit 22, a comparator unit 23, a charge storage unit 24, and a sensing unit 25.

The light emitting unit 21 may be a cold cathode fluorescent lamp (CCFL), a hot cathode fluorescent lamp (HCFL), or a light emitting diode (LED). In the embodiment the light emitting unit 21 is a CCFL for example.

The switching unit 22 is electrically connected to the light emitting unit 21. The switching unit 22 may include a bipolar junction transistor (BJT) or a metal oxide semiconductor field effect transistor (MOSFET). In the embodiment, the switching unit 22 is a MOSFET for example. In addition, the switching unit 22 and the light emitting unit 21 are connected in parallel. Alternatively, they can also be connected in series or in other ways depending on different designs in the embodiment.

The comparator 23 is electrically connected to the switching unit 22. In the embodiment, the comparator unit 23 is a voltage comparator for example.

The charge storage unit 24 is electrically connected to the comparator unit 23 and stores an amount of electric charges. In the embodiment, the charge storage unit 24 is a capacitor for example. The amount of the electric charges is detected by the comparator unit 23 in the voltage form.

The sensing unit 25 is electrically connected to the charge storage unit 24 and has a light sensing circuit 251. The light sensing circuit 251 senses a light intensity of the light emitting unit 21, the sensing unit 25 adjusts the amount of the electric charges and the a voltage V1 corresponding to the amount of the electric charges according to the light intensity. Then the comparator unit 23 compares the voltage V1 and a threshold voltage V2. The switching unit 22 controls the light emitting unit 21 in accordance with the result of the comparison.

When there is no light, however, the amount of the electric charges and the voltage V1 corresponding to the amount of the electric charges are consumed by a background dark current in the light sensing circuit 251. Therefore, the value of the background dark current generated by the environment temperature in the sensing unit 25 is offset by a background dark current reference value of a background reference value element from the comparator unit 23 or the sensing unit 25, so that the light emission time range of the light emitting unit 21 is more precisely corresponding to the desired accumulating light energy.

It is noted that the electrical connection described herein may be a direct electrical connection or an indirect electrical connection. The indirect electrical connection is to electrically connect two elements with another element (e.g. a switching element).

In addition, if the LED of the light emitting unit 21 is a color LED for sensing the light in a specific wavelength range, the sensing unit 25 may include a color filter that is disposed next to the light sensing circuit 251. The color filter may be a red filter, a green filter, a blue filter, or a white filter, or even an infrared filter corresponding to the emission wavelength of the LED.

Figure 3A:
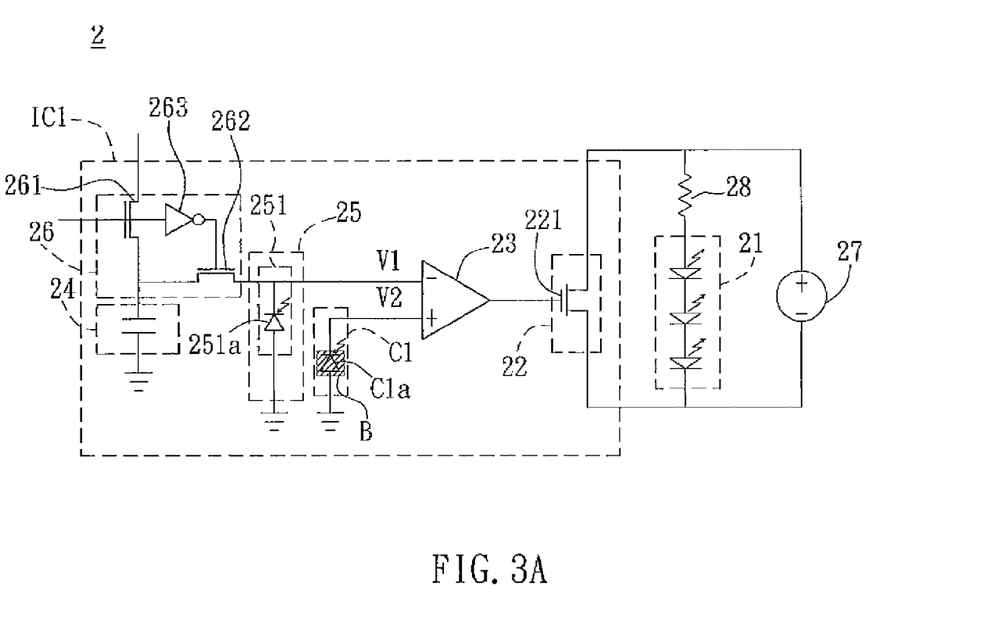
FIG. 3A is a schematic view of the light emitting device according the first embodiment of the invention.

As shown in FIG. 3A, the light emitting device 2 may further include a control unit 26, a power supply unit 27, and a current limiting unit 28 in the embodiment. Additionally, the switching unit 22 has a switching element 221. In the embodiment, the switching unit 221 is a MOSFET for example.

The control unit 26 includes a BJT, a MOSFET, and/or an inverter. In the embodiment, two MOSFETs 261 and 262 and an inverter 263 are used as an example. The control unit 26 is electrically connected to the charge storage unit 24. When the MOSFET 261 is on, an electric charge will be inputted to the charge storage unit 24. When the MOSFET 261 is off, after a switching signal is inverted through the inverter 263, the MOSFET 261 is on. The charge storage unit 24 is electrically connected to the sensing unit 25 through the MOSFET 262.

The power supply unit 27 is electrically connected to the light emitting unit 21 and provides a DC power supply or an AC power supply to the light emitting unit 21. In the embodiment, the power supply is a DC power supply for example.

The current limiting unit 28 is a resistor for example, and is electrically connected to the power supply unit 27 and the light emitting unit 21 so as to limit the amount of current that drives the light emitting unit 21 and prevent the overloaded current from damaging the light emitting unit 21.

Furthermore, the threshold voltage V2 is provided by a threshold voltage generating circuit C1 in the embodiment. The light sensing circuit 251 includes a light sensing element 251a, and the threshold voltage generating circuit C1 includes a background reference value element C1a.

The light sensing element 251a includes a photodiode or a photosensitive resistor. The background reference value element C1a also includes a photodiode and a photosensitive resistor. In the embodiment, each of the light sensing element 251a and the background reference value element C1a is a LED for example. The light sensing element 251a and the background reference value element C1a are elements in the same form. The background reference value element C1a is shielded from the light so that it does not function with the light intensity of the light emitting unit 21. In addition, the light emitting device 2 further includes a light shielding unit B that is used to shield the background reference value element C1a in the embodiment. The material of the light shielding unit B may be metal, polycrystalline silicon, or light shielding ink for example, and may be formed by a semiconductor manufacturing process.

Thus, the light sensing circuit 251 generates not only the photocurrent by sensing the light intensity of the light emitting unit 21 but also the background dark current by the environment temperature. The light sensing circuit 251 adjusts the amount of the electric charges and a voltage V1 corresponding to the amount of the electric charges in accordance with both of the photocurrent and dark current. Moreover, the threshold voltage generating circuit C1 generates the threshold voltage V2 according to only the background reference element C1a that does not receive the light.

Therefore, the comparator unit 23 compares the voltage V1 adjusted by the light sensing circuit 251 with the threshold voltage V2 generated by the threshold voltage generating circuit C1, so the effects caused by the dark current can be offset. Then the comparator unit 23 is used again to control the light emitting unit 21 by controlling the switching element 221 of the switching unit 22.

In the embodiment, at least any two of the switching unit 22, the comparator unit 23, the charge storage unit 24, the sensing unit 25, and the control unit 26 may be disposed on an integrated circuit IC1 (shown as dotted lines in FIG. 3A).

Figure 3B:
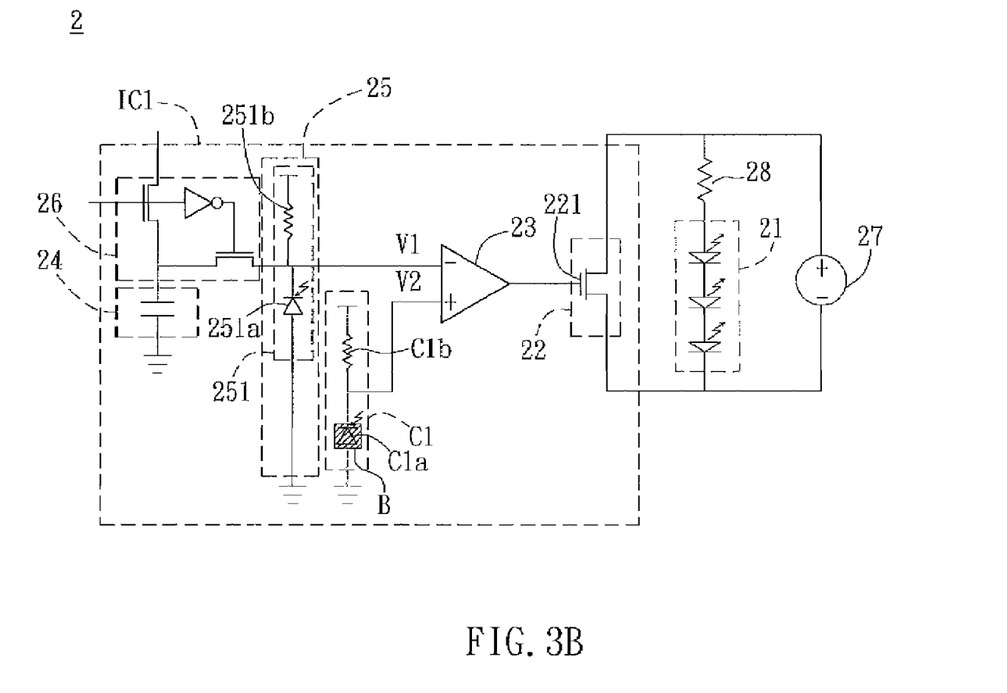
FIG. 3B is a schematic view of an aspect of the light emitting device according to the first embodiment of the invention.

Also, with reference to FIG. 3B, the light sensing circuit 251 further includes a resistor 251b, and the threshold voltage generating circuit C1 further includes a resistor C1b in the embodiment. The light sensing circuit 251 and the threshold voltage generating circuit C1 will have the voltage dividing function by connecting the two resistors 251b and C1b in series to the photodiode of the light sensing element 251a and the photodiode of the background reference value element C1a, respectively.

Figure 4A:
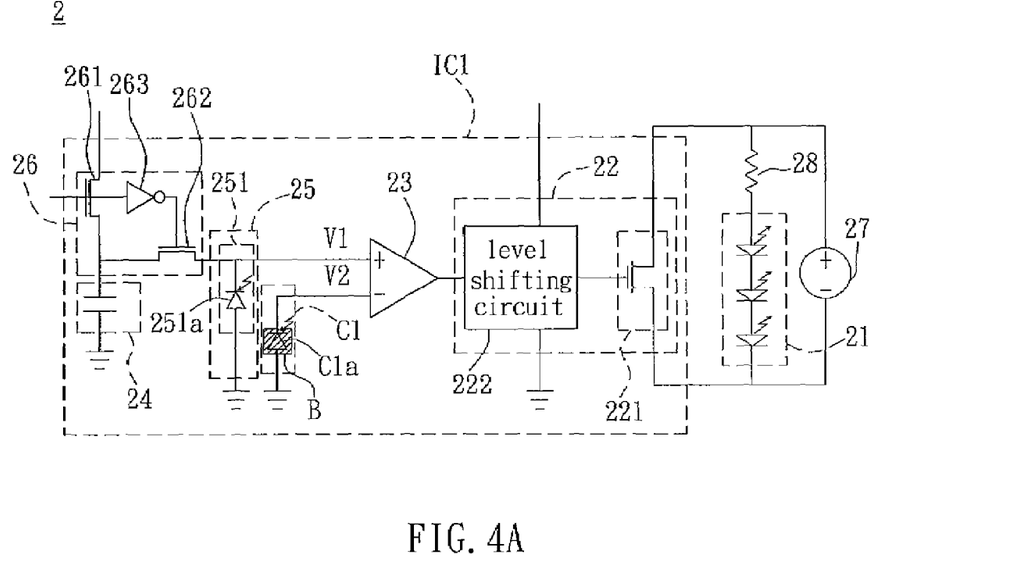
FIG. 4A is a schematic view of another aspect of the light emitting device according to the first embodiment of the invention.
Figure 4B:
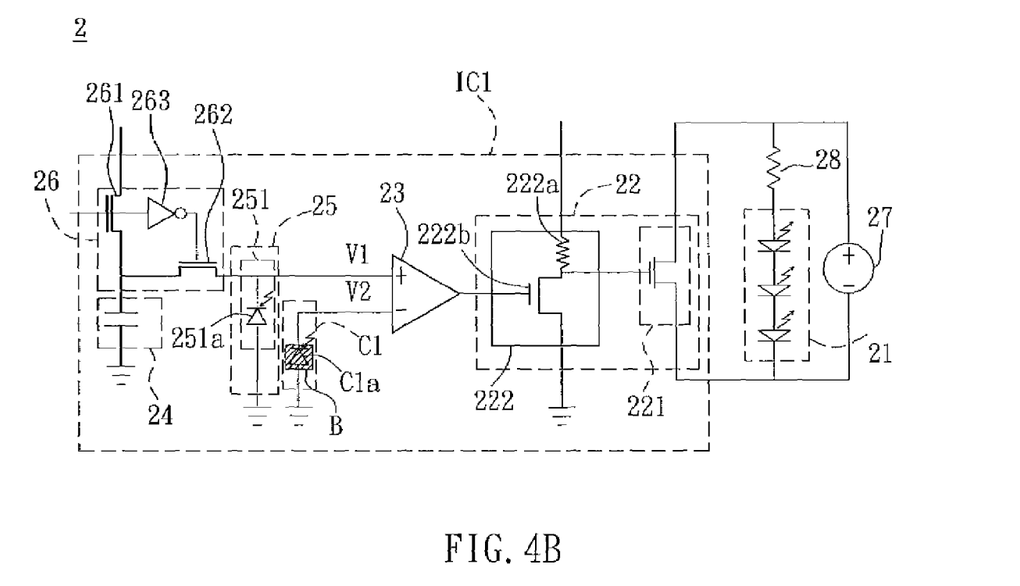
FIG. 4B is a schematic view of still another aspect of the light emitting device according to the first embodiment of the invention.

Additionally, with reference to FIG. 4A, the switching unit 22 further includes a level shifting circuit 222 that includes the resistor, BJT, and/or MOSFET and is electrically connected to the switching unit 221 in the embodiment. The level shifting circuit 222 may be used to increase the voltage level inputting to the switching unit 221 and to filter the noise from the input signal. Thus the switching unit 22 responds more rapidly. Also, a design of the level shifting circuit 222 is shown in FIG. 4B. The level shifting circuit 222 may be formed by connecting a resistor 222a in series to a MOSFET 222b.

At last, it is to be noted that the design of the level shifting circuit 222 is not limited to the embodiment, and the priority is to include the essential functions.

Figure 5:
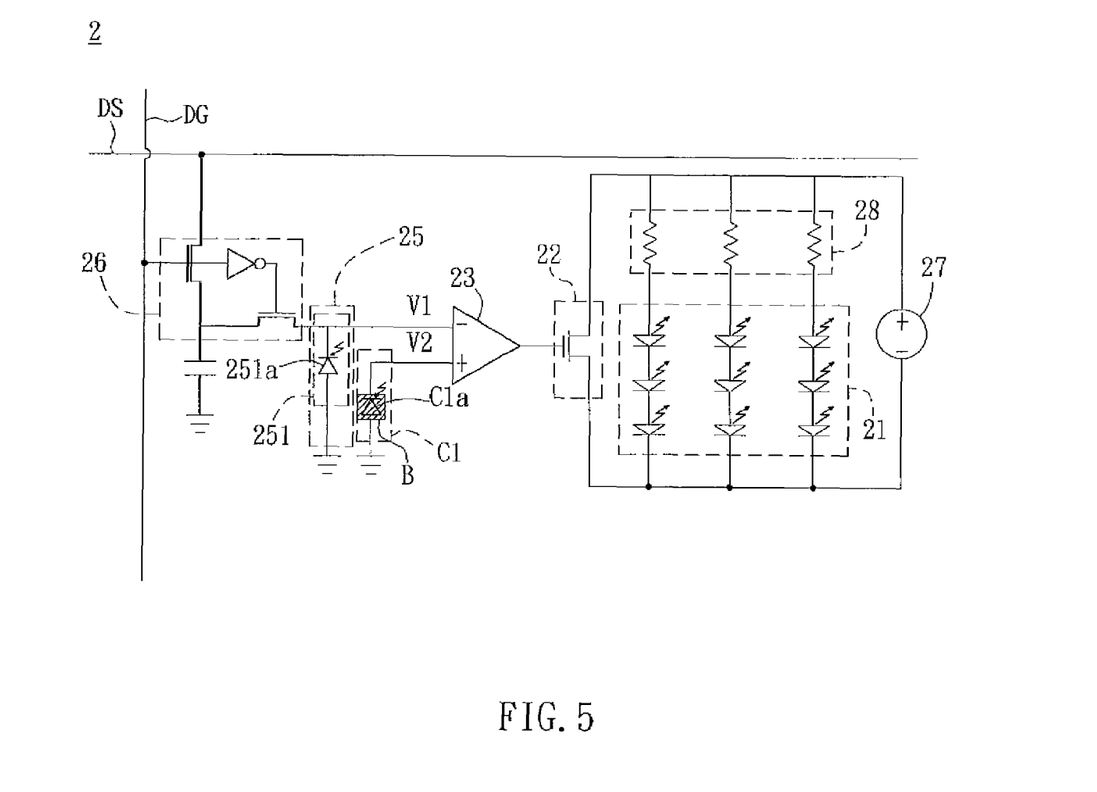
FIG. 5 is a schematic view of yet another aspect of the light emitting device according to the first embodiment of the invention.

With reference to FIG. 5, the light emitting unit 21 further includes three sets of the LEDs electrically connected in parallel in the embodiment. The current limiting unit 28 further includes three resistors that are electrically connected to the three corresponding sets of the LEDs. The three sets of the LEDs may be a red LED, a green LED and a blue LED, or a LED in any color, respectively.

Furthermore, the light emitting device 2 may further include a row/gate driving circuit DG and a column/source driving circuit DS in the embodiment.

The row driving circuit DG is electrically connected to the control unit 26 to control the MOSFET 261 of the control unit 26. The column driving circuit DS is also electrically connected to the control unit 26 so as to input the amount of the electric charges through the MOSFET 261 to the charge storage unit 24 when the MOSFET 261 is on. Since the MOSFET 261 is used in the embodiment, the row driving circuit DG is called a gate driving circuit and is electrically connected to a gate of the MOSFET 261, and the column driving circuit DS is called a source driving circuit and is electrically connected to a source of the MOSFET 261.

Figure 6:
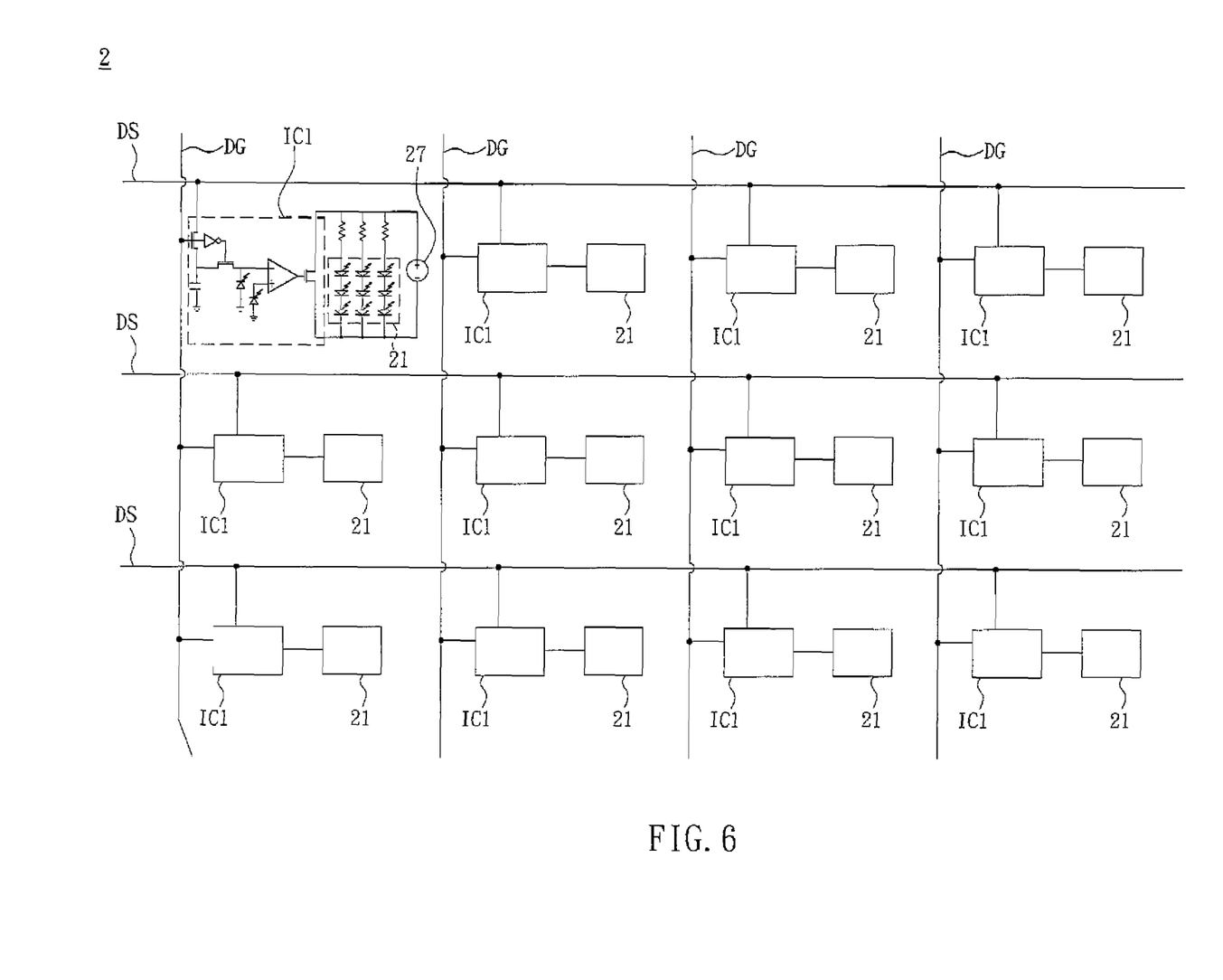
FIG. 6 is a schematic view of the light emitting device implementing sector control according to the first embodiment of the invention.

With reference to FIG. 6, when the light emitting device 2 has multiple sets of light emitting unit 21, the row driving circuit DG and the column driving circuit DS can be electrically connected to the control unit 26 in the row and column disposition in the embodiment. The row driving circuit DG and the column driving circuit DS control the control unit 26 separately to control the light emitting unit 21.

Second Embodiment

Figure 7:
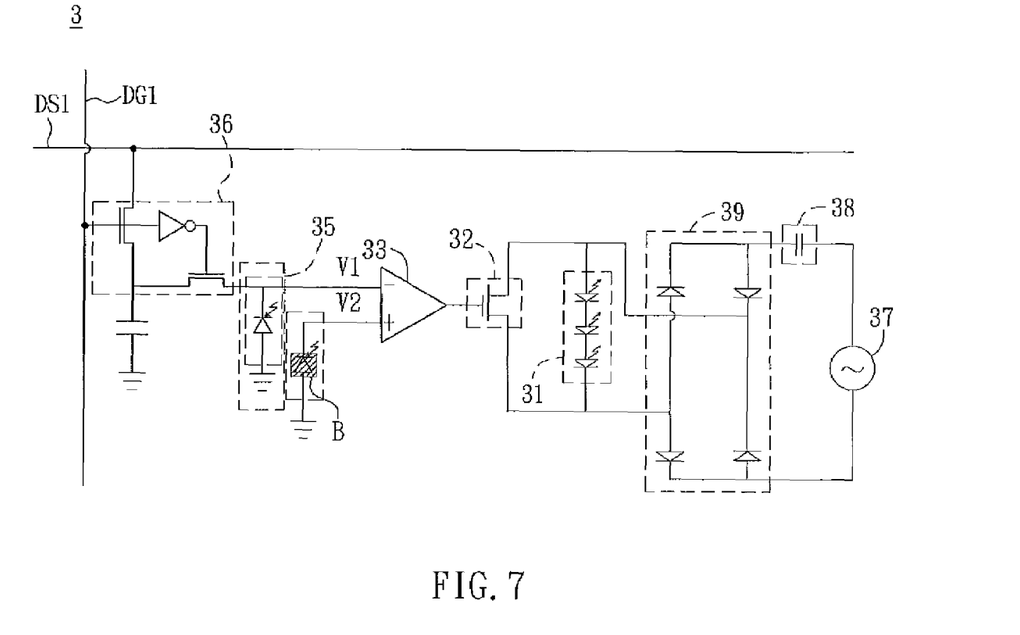
FIG. 7 is a schematic view of a light emitting device according to a second embodiment of the invention.

With reference to FIG. 7, a light emitting device 3 of a second embodiment of the invention includes a light emitting unit 31, a switching unit 32, a comparator unit 33, a charge storage unit 34, a sensing unit 35, a control unit 36, a power supply unit 37, a current limiting unit 38, a rectifier unit 39, a row driving circuit DG1, and a column driving circuit DS1.

The switching unit 32, the comparator unit 33, the charge storage unit 34, the sensing unit 35, the control unit 36, the row driving circuit DG1, and the column driving circuit DS1 of the embodiment have the identical structures and functions as those of the first embodiment, so the detailed descriptions thereof will be omitted.

What is worth to be mentioned is that at least any two of the light emitting unit 31, the switching unit 32, the comparator unit 33, the charge storage unit 34, the sensing unit 35, and the control unit 36 may be disposed in an integrated circuit (not shown).

The differences between the second embodiment and the first embodiment are that the power supply unit 37 provides an AC power, the light emitting unit 31 includes a LED or a plurality of the LEDs that are connected in series, and the rectifier unit 39 is electrically connected to the current limiting unit 38 and the light emitting unit 31, respectively. In the embodiment, the rectifier unit 39 is a full-bridge rectifier circuit. After the full-bridge rectifier circuit full-wave rectifies the AC power, the rectified AC power is inputted to drive the light emitting unit 31. The current limiting unit 38 can be a capacitor. Thus the real power of the circuit will not be consumed so as to enhance the power efficiency.

Third Embodiment

Figure 8A:
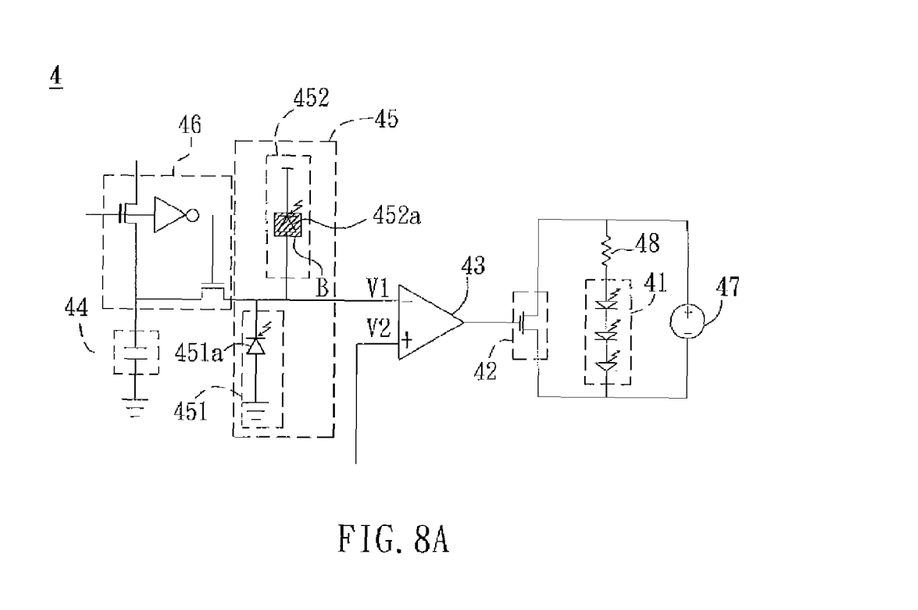
FIG. 8A is a schematic view of a light emitting device according to a third embodiment of the invention.

With reference to FIG. 8A, a light emitting device 4 according to a third embodiment of the invention includes at least one light emitting unit 41, a switching unit 42, a comparator unit 43, a charge storage unit 44, a sensing unit 45, a control unit 46, a power supply unit 47, and a current limiting unit 48.

The structures and the functions of the light emitting unit 41, the switching unit 42, the comparator unit 43, the charge storage unit 44, the control unit 46, the power supply unit 47, and the current limiting 48 of the embodiment are identical to those of the second embodiment, so the detailed descriptions thereof will thus be omitted.

The differences between the third embodiment and the above embodiments are that the threshold voltage V2 is a preset threshold voltage, and the sensing unit 45 further includes a background reference value generating circuit 452 that generates a background reference value signal. The sensing unit further compensates the effects caused by the background dark current resulted from adjusting the amount of the electric charges and the voltage V1 corresponding to the amount of the electric charges in accordance with the background reference value signal. The background reference value generating circuit 452 of the embodiment includes a background reference value element 452a that is identical to the background reference value element C1a of the first embodiment, so the detailed descriptions thereof will be omitted.

The effects caused by the background dark current can be offset by comparing the voltage V1 and the threshold voltage V2. The voltage V1 is adjusted by the circuit formed of a light sensing element 451a and the background reference value element 452a.

Figure 8B:
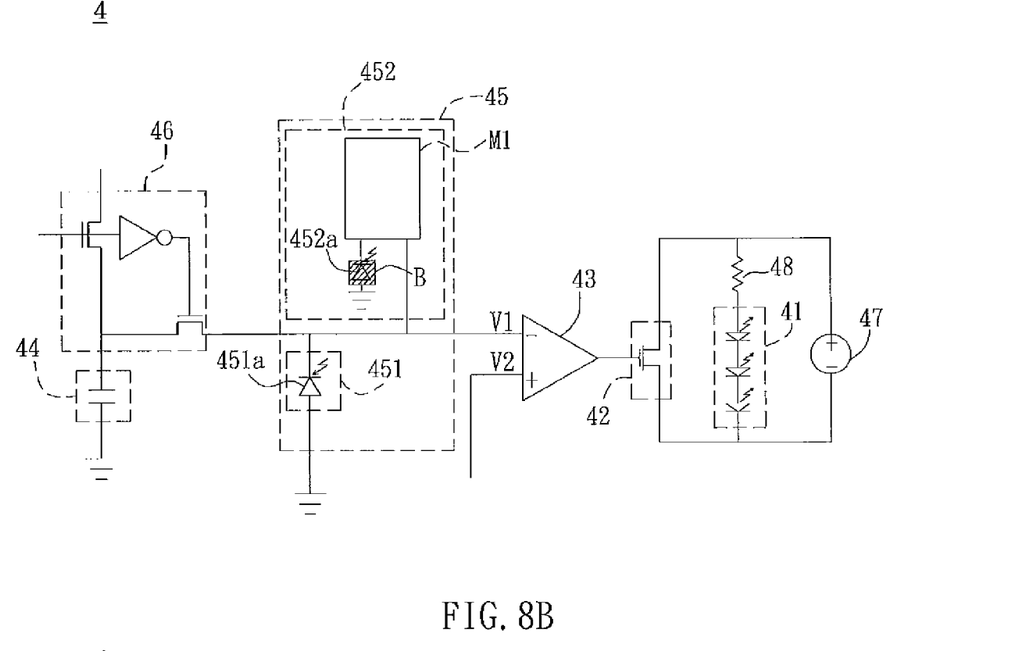
FIGS. 8B and 8C are schematic views of an aspect of a light emitting device according to the third embodiment of the invention.
Figure 8C:
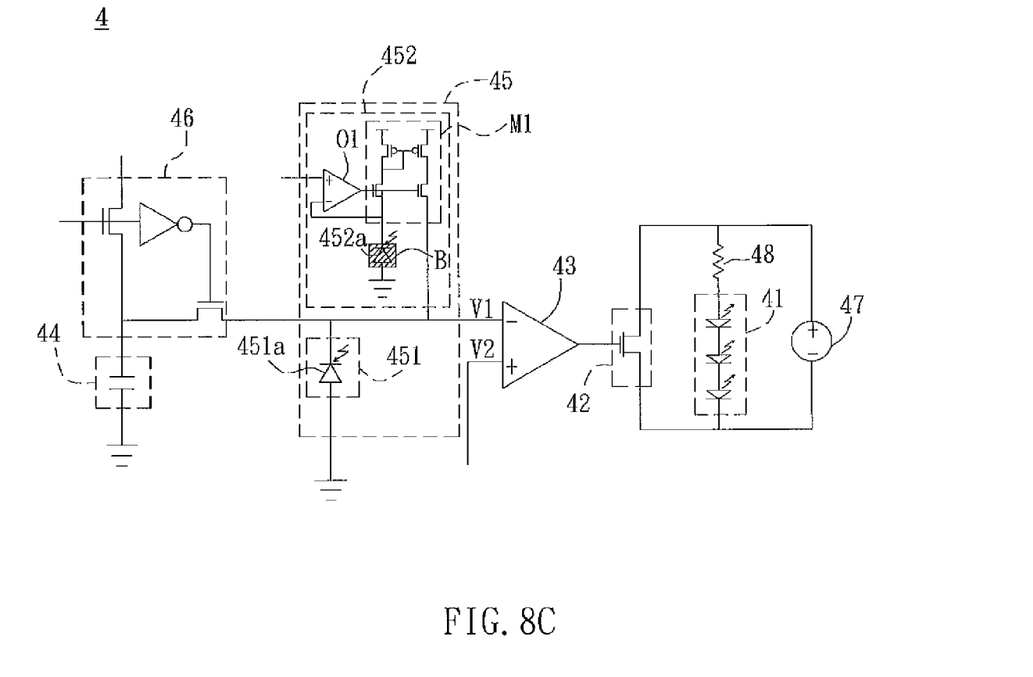

Moreover, with reference to FIG. 8B, the background reference value element 452a may also be electrically connected to a current mirror M1 to duplicate and output the dark current. With reference to FIG. 8C, the current mirror M1 may also be electrically connected to an operational amplifier O1 so as to control a bias voltage of the background reference value element 452a in the embodiment. It is noted that the design of the current mirror M1 is not limited to the embodiment, and the design priority is to enhance the efficiency of the entire circuit.

Figure 9:
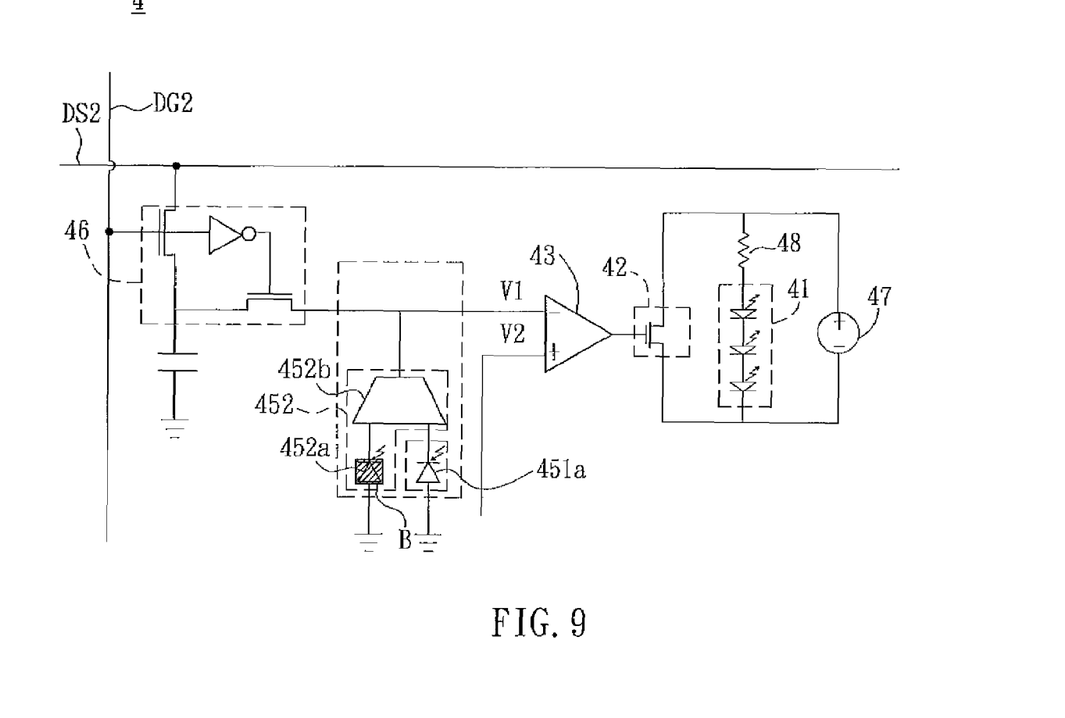
FIG. 9 is a schematic view of another aspect of the light emitting device according to the third embodiment of the invention.

Another aspect of the light emitting device 4 according to the third embodiment of the invention is shown in FIG. 9. The background reference value generating circuit 452 of the sensing unit 45 further includes a current subtractor 452b and is electrically connected to the light sensing element 451a and the background reference element 452a, thereby offsetting the background dark current.

Figure 10A:
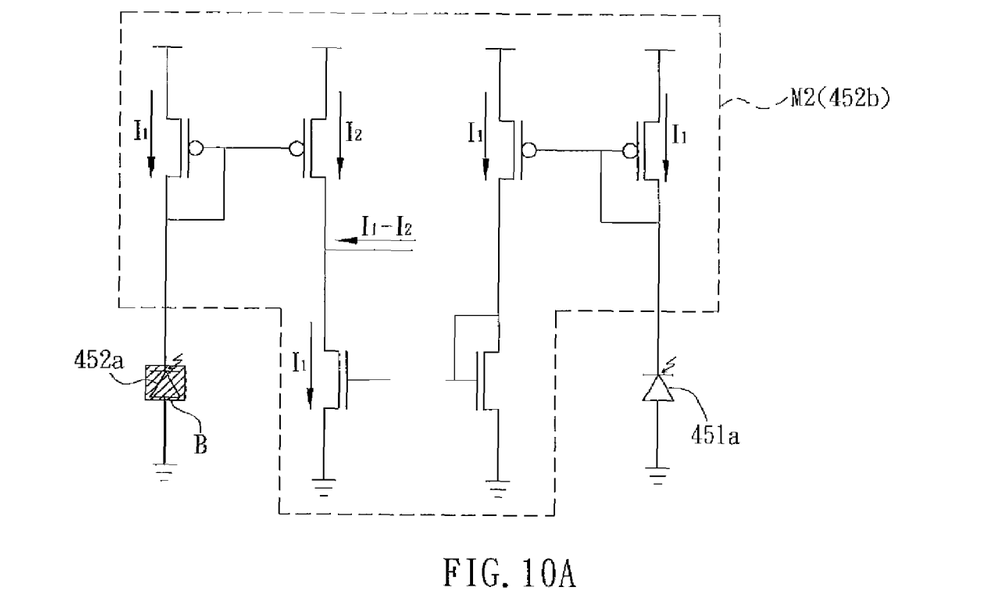
FIGS. 10A to 10C are schematic views of various aspects of the subtractor in FIG. 9.
Figure 10B:
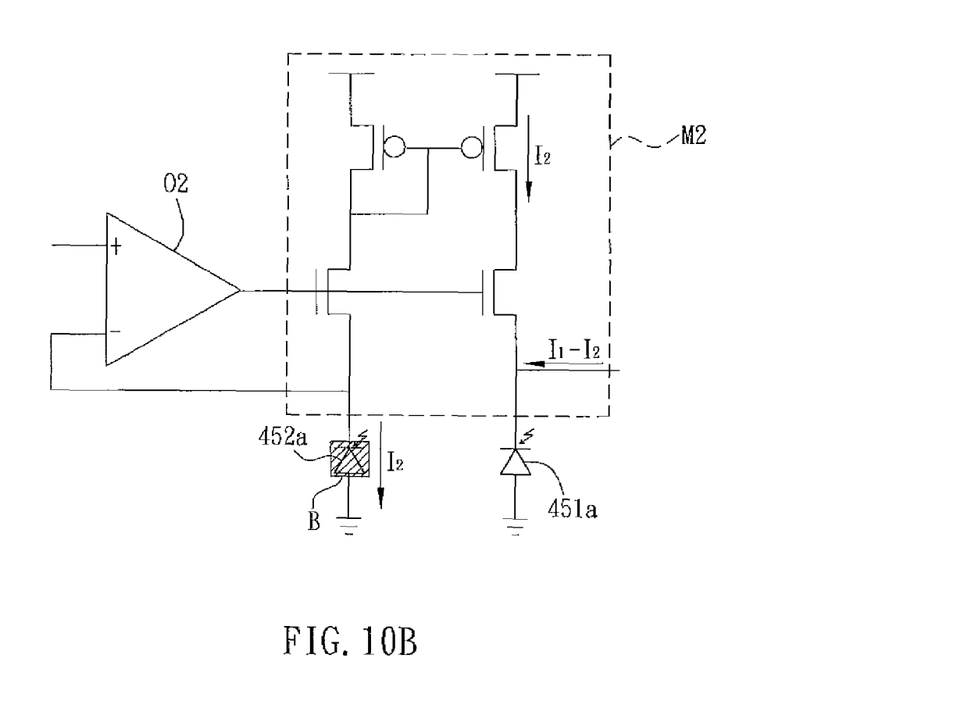
Figure 10C:
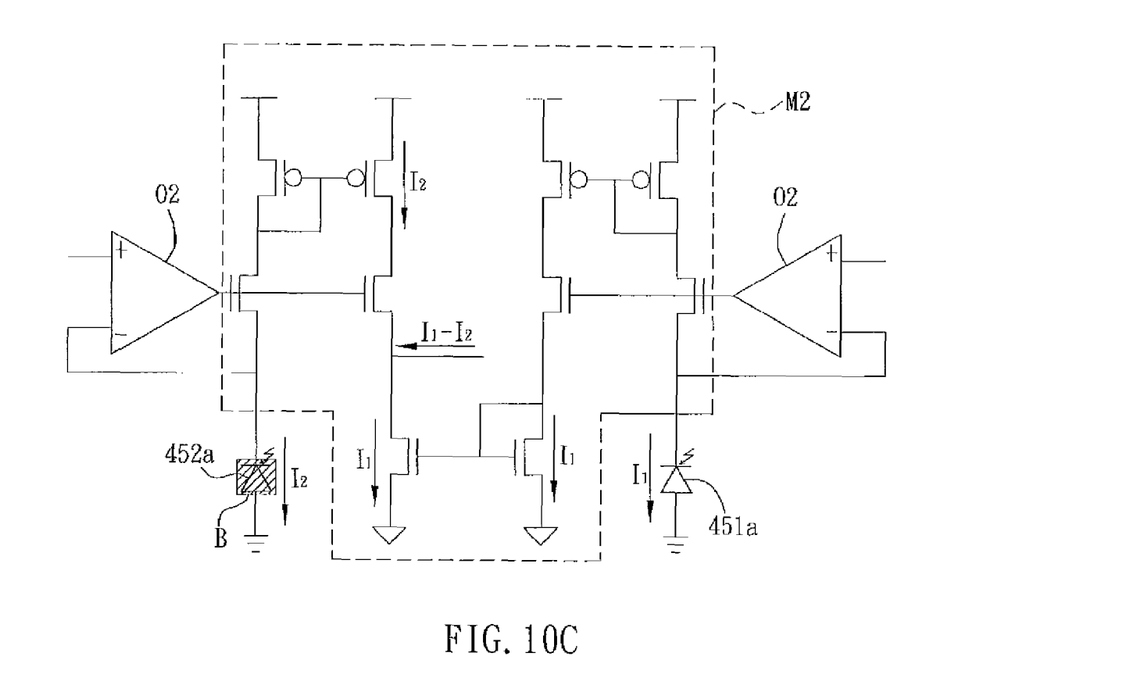

With reference FIGS. 10A to 10C, different designs may be created by the current subtractor 452b using a current mirror M2 and an operational amplifier O2. I1 and I2 represent the current passing through the photodiode of the light sensing element 451a and the photodiode of the background reference value element 452a, respectively. It is noted that the design of the current subtractor 452b is not limited to the embodiment, and different designs may be created for different needs. The priority is to enhance the efficiency of the entire circuit.

Figure 11:
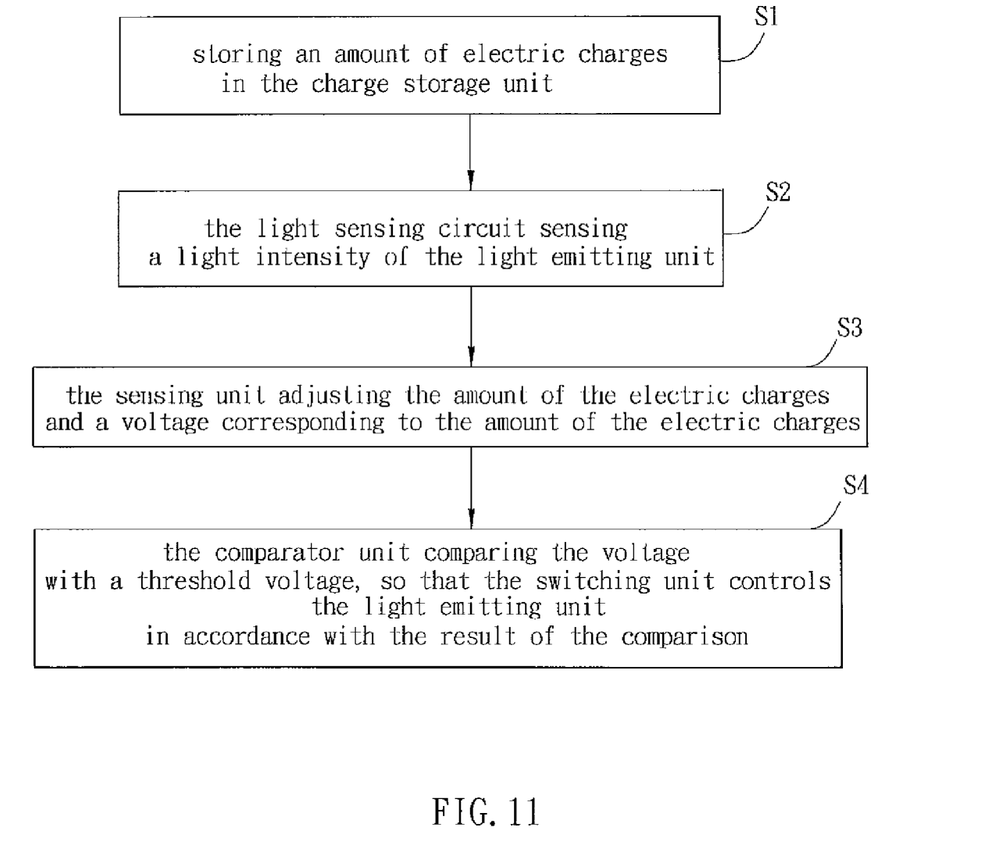
FIG. 11 is a flow chart of a control method of the light emitting device according to the invention.

With reference to FIG. 11, a control method of a light emitting device according to a preferred embodiment of the invention includes the steps as follow. Step S1 is to store an amount of electric charges in a charge storage unit. Step S2 is to sense a light intensity of the light emitting device by a sensing unit. Step S3 is to adjust the amount of the electric charges and a voltage corresponding to the amount of the electric charges by the sensing unit. Step S4 is to compare the voltage and a threshold voltage by a comparator unit, and to control the light emitting unit by a switching unit in accordance with the result of the comparison. Since the control method of the light emitting unit is illustrated in the above embodiment, the detailed description thereof will be omitted.

To sum up, the light emitting device and the control method thereof utilizes the characteristics of the light sensing element of the sensing unit that can generate the photocurrent after receiving a light from the light emitting unit to adjust the amount of the electric charges in the charge storage unit. In addition, a background reference value element that does not receive the light is used to generate the background dark current reference value. The effects caused by the dark current can be compensated by adjusting the amount of the electric charges in the charge storage unit according to the value difference between the photocurrent and the background dark current reference value. Another way to compensate is that, in a threshold voltage generating circuit, the effects caused by the background dark current are offset by adjusting the threshold voltage according to a background reference value element when the comparator unit compares. Thereby the comparator unit can determine the light emission time range of the light emitting unit to control the accumulating light energy, which means, the switching unit controls the light emitting unit to end the light emission when the accumulating light energy reaches a preset value. What is worth to be mentioned is that the light emitting device and the control method thereof is not to have the feedback control on the light intensity of the light emitting unit, but control the accumulating light energy so as to lower the cost of the circuit structure. Furthermore, the cost is lowered by the modulization of the integrated circuit that is able to effectively decrease the number of elements.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A light emitting device, comprising:
   at least one light emitting unit;
   a switching unit electrically connected to the light emitting unit;
   a comparator unit electrically connected to the switching unit;
   a charge storage unit electrically connected to the comparator unit and storing an amount of electric charges; and
   a sensing unit electrically connected to the charge storage unit and having a light sensing circuit for sensing a light intensity of the light emitting unit, wherein the sensing unit adjusts the amount of the electric charges and a voltage corresponding to the amount of the electric charges according to the light intensity,
   wherein the comparator unit compares the voltage with a threshold voltage and the switching unit controls the light emitting unit in accordance with the result of the comparison.

2. The light emitting device according to claim 1, wherein the light emitting device comprises a light emitting diode (LED).

3. The light emitting device according to claim 1, wherein the switching unit comprises a switching element.

4. The light emitting device according to claim 3, wherein the switching unit further comprises a level shifting circuit electrically connected to the switching element.

5. The light emitting device according to claim 4, wherein the level shifting circuit comprises a resistor, a BJT, and/or a metal oxide semiconductor field effect transistor (MOSFET).

6. The light emitting device according to claim 1, wherein the light sensing circuit comprises a light sensing element.

7. The light emitting device according to claim 6, wherein the sensing unit further comprises a background reference value generating circuit for generating a background reference value signal, and the sensing unit further compensates effects caused by a background dark current of the light sensing element in accordance with the background reference value signal.

8. The light emitting device according to claim 7, wherein the background reference value generating circuit comprises a background reference value element.

9. The light emitting device according to claim 1, wherein the sensing unit comprises a current subtractor or a current mirror.

10. The light emitting device according to claim 1, wherein the threshold voltage is a preset threshold voltage value or is generated by a threshold voltage generating circuit.

11. The light emitting device according to claim 10, wherein the threshold voltage generating circuit includes a background reference value element.

12. The light emitting device according to claim 11, further comprising:
   a light shielding unit for shielding the background reference value element.

13. The light emitting device according to claim 12, wherein the material of the light shielding unit is metal, polycrystalline silicon, or light shielding ink.

14. The light emitting device according to claim 1, further comprising:
   a control unit electrically connected to the charge storage unit, wherein the electric charges are inputted to the charge storage unit through the control unit.

15. The light emitting device according to claim 14, wherein the control unit comprises a bipolar junction transistor (BJT), a metal oxide semiconductor field effect transistor (MOSFET), and/or an inverter.

16. The light emitting device according to claim 14, further comprising:
   a row driving circuit electrically connected to the control unit for controlling the control unit; and
   a column driving circuit electrically connected to the control unit for inputting an electric charge to the charge storage unit.

17. The light emitting device according to claim 1 further comprising a power supply unit electrically connected to the light emitting unit and providing a power source to the light emitting unit.

18. The light emitting device according to claim 17 further comprising a current limiting unit electrically connected to the power supply unit and the light emitting unit, respectively.

19. The light emitting device according to claim 17 further comprising a rectifier unit electrically connected to the light emitting unit and the power supply unit, respectively.

20. The light emitting device according to claim 1, wherein the sensing unit further comprises a color filter disposed adjacent to the light sensing circuit.

21. A control method of a light emitting device, wherein the light emitting device has at least one light emitting unit, a switching unit, a comparator unit, a charge storage unit, and a sensing unit, the switching unit is electrically connected to the light emitting unit, the comparator unit is electrically connected to the switching unit, the charge storage unit is electrically connected to the comparator unit, the sensing unit is electrically connected to the charge storage unit and has a light sensing circuit, the control method comprising the steps of:
   storing an amount of electric charges in the charge storage unit;
   the light sensing circuit sensing a light intensity of the light emitting unit;
   the sensing unit adjusting the amount of the electric charges and a voltage corresponding to the amount of the electric charges according to the light intensity; and
   the comparator unit comparing the voltage with a threshold voltage, so that the switching unit controls the light emitting unit in accordance with the result of the comparison.

22. The control method according to claim 21 further comprising a step of:
   inputting a power source to the light emitting unit.

* * * * *